United States Patent

Braun

[11] Patent Number: 5,188,482
[45] Date of Patent: Feb. 23, 1993

[54] OIL CONFINEMENT DEVICE

[76] Inventor: Henry D. Braun, 2421 84th Ave., S.E., Calgary, Alta., Canada, T2C 0K7

[21] Appl. No.: 737,669

[22] Filed: Jul. 3, 1991

[51] Int. Cl.$^5$ .............................. E02B 15/04
[52] U.S. Cl. ...................... 405/70; 405/63; 405/66; 405/72
[58] Field of Search .................... 405/63-72; 210/242-243, 923

[56] References Cited

U.S. PATENT DOCUMENTS

| | | | |
|---|---|---|---|
| 3,499,291 | 3/1970 | Mikkelsen | 405/70 X |
| 3,563,036 | 2/1971 | Smith et al. | 405/69 |
| 3,564,852 | 2/1971 | Smith | 405/66 |
| 3,751,925 | 8/1973 | Thurman | |
| 3,783,622 | 1/1974 | Gambel | |
| 3,786,637 | 1/1974 | Muramatsu et al. | 405/72 |
| 3,839,870 | 10/1974 | Ryan | |
| 4,033,137 | 7/1977 | Geist | |
| 4,398,844 | 8/1983 | Jaffrennou et al. | 405/72 |
| 5,054,960 | 10/1991 | Manzano et al. | 405/72 |

Primary Examiner—Randolph A. Reese
Assistant Examiner—John Ricci
Attorney, Agent, or Firm—Norman B. Rainer

[57] ABSTRACT

A device for confining oil floating upon the surface of a large body of water employs a horizontally deployable continuous pliable oil-resistant wall having parallel upper and lower edges. A multitude of uniformly spaced vertical support members are attached to the wall. A non-extendable cable engages the vertical support members in parallel relationship to the edges of the wall. Floatation devices are attached to the vertical support members adjacent the upper edge of the wall, and weight devices are attached to the vertical support members adjacent the lower edge of the wall. The effect of the flotation and weight devices is to cause the wall to ride vertically in the water with its upper edge extending above the oil level.

6 Claims, 2 Drawing Sheets

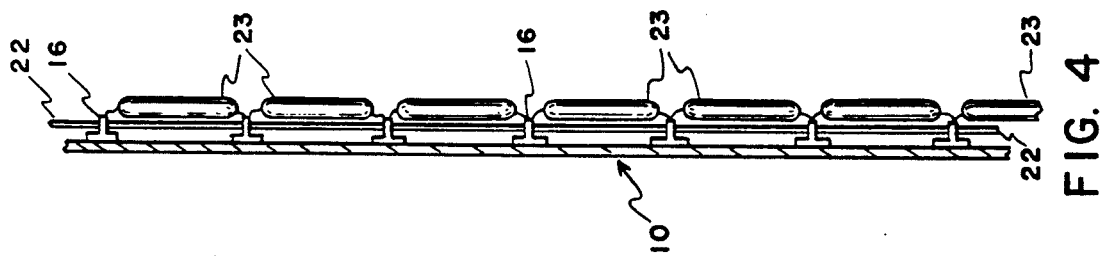
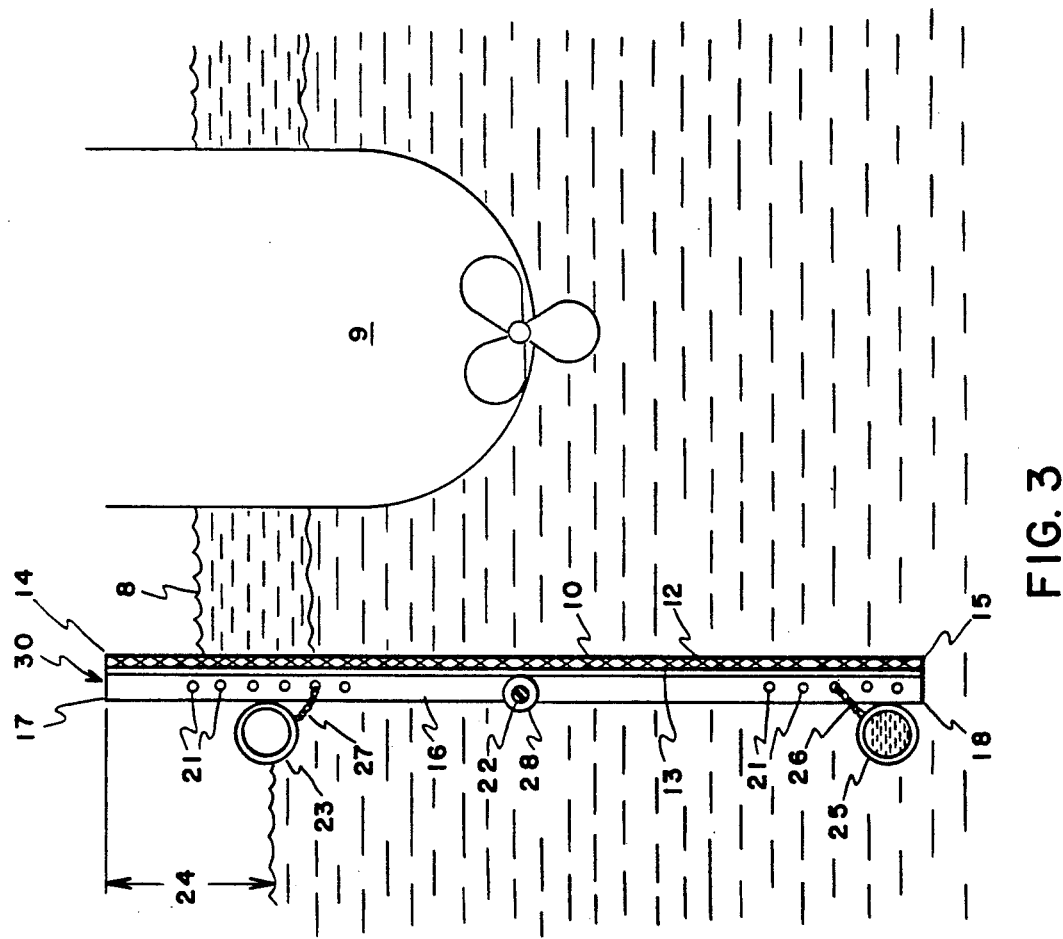

OIL CONFINEMENT DEVICE

BACKGROUND OF THE INVENTION

1. Field of the Invention

This invention relates to apparatus for enclosing areas of bodies of water so as to prevent oil or other floating chemicals from escaping said areas.

2. Description of the Prior Art

As the need for liquid hydrocarbon fuels increases, there is greater activity in securing petroleum oil from offshore wells. Also, oil is being transported by tankers of large size over ever lengthening routes, causing the total quantity of oil afloat enroute from source to market to be of great magnitude. Offshore oil-producing operations together with the oil afloat in vessels present a significant threat to the ecology of the sea, against which no truly effective defense has yet been devised.

Systems capable of easy deployment and retrieval to preventively enclose an offshore well or spill area are urgently required. Any successful means for corralling floating oil must be promptly deployable, and capable of confining the oil, even during heavy wave action, until it can be pumped off. Suitable corralling devices must be stored in a compact state upon oil platforms, tankers and skimmer ships.

There is considerable prior art concerning devices which form a floating enclosure. A number of such devices utilize inflatable members having pendant structures. However, many prior devices are more concerned with the thin layer oil slicks on calm water than thick layer spills in open ocean.

Oil containment devices of continuous length have been constructed of pliable material throughout their length, and therein achieve wave profile adaptability. These normally have flexible elongated float means that serve as a surface barrier. A pendant sub-surface curtain barrier of pliable material serves to prevent eddy currents from carrying oil under the barrier. The flexibility of continuous curtain barriers permits conformation to waves, but also allows the bottom of the barrier to balloon out and allow oil pass underneath. Such escape of oil occurs due to currents and when the confining device is being used as a towed collection boom. The flexibility of the float means is limited, and necessarily prevents full adaptation of the barrier to wave profile in heavy waters. This results in wave action lifting the barrier above the surface of troughs between waves and permits underneath escape of oil. In addition, the freeboard of curtain type barriers is limited to the height of the float means, so that oil can splash over the top. Larger floats on rigid pontoons can be used, of course, but these further decrease flexibility of the barrier.

Some earlier oil-confining devices have been of non-inflatable, rigid design, particularly adapted to shallow water conditions, which do not present the problems encountered in deeper waters and rougher seas. Representative devices of such nature are disclosed in U.S. Pat. Nos. 3,494,132; 3,503,512; 3,537,587; 3,592,005; 3,592,007; and 3,592,008.

Still other prior art devices have been comprised of a multiplicity of rigid panels joined in a manner to permit articulated vertical movement and pivotal horizontal movement between adjacent panels. Such devices have require complex assembly under rough sea conditions. The time taken to deploy such devices allows significant spreading of an oil slick while the assembly process takes place. In fact, many of these devices, such as disclosed in U.S. Pat. No. 3,751,925, must be assembled in advance and towed in a vertical disposition to the location of a spill. Although it is designed for rough sea conditions, it would be difficult or impossible to tow such an assembled structure of a length capable of encircling a large spill through rough seas. Many such devices have pivotal joints between barriers which permit leakage of spilled oil through the barrier. Oil confining devices of this type often do not allow for the adjustability of wall height, and therefore may not be rapidly adapted to varying sea conditions and depths of oil spill.

Furthermore, multiple panel devices are expensive to produce and are heavy and cumbersome in nature. For example, a single wall panel as disclosed in U.S. Pat. No. 3,783,662 can weigh as much as 18,400 pounds. It is unlikely that even a large attending ship or oil rig could carry enough panels of this nature to encircle a spill of significant size. Panels such as those disclosed in U.S. Pat. No. 4,033,137 require the precise vertical alignment of panels in order to properly assemble and deploy the device. The handling of such panels on the open sea would certainly require a crane.

It is therefore an object of the present invention to provide an oil confining device which is flexible, light in weight and amenable to storage in a compact yet easily deployable state.

It is another object of the present invention to provide a device of the aforesaid nature which may be rapidly deployed and stored under a variety of weather and sea conditions with minimal manpower and without the use of heavy cranes.

It is another object of the present invention to provide a device of the aforesaid nature which is continuous in nature, having no articulating or pivotal joints.

It is yet another object of the present invention to provide a device of the aforesaid nature which is adjustable in freeboard height and depth and will not deform due to wave action or otherwise permit oil to pass beneath.

It is still another object of the present invention to provide a device of the aforesaid nature of rugged, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a device for confining oil or other substances floating upon the surface of large bodies of water, said device comprised of:

a) an elongated continuous wall of pliable oil resistant material having interior and exterior surfaces, and substantially straight parallel upper and lower edges, b) a multiplicity of rigid support members having upper and lower extremities and a plurality of mounting apertures, said support members being affixed to said exterior surface in uniformly spaced apart relationship and orthogonal to said upper and lower edges, c) non-extendable tether means extending in joinder between adjacent support members in parallel disposition to said edges and adapted to limit the spacing of said support members and thereby relieve longitudinal stresses along said wall, d) float means adapted to engage said apertures at varying points of said support members, causing said upper edge to rise a height above the oil level, defined as freeboard height, and e) sinker means adapted to engage said support members adjacent their lower extremities, and thereby maintain said wall in vertical disposition.

In a preferred embodiment, the wall material is an oil impervious flexible membrane fabricated of neoprene rubber or equivalent material. In some embodiments, the membrane may be pleated to enhance its ability to oscillate with wave motion of the water.

The support members may have a T-shaped cross section and be constructed from stainless steel, engineering grade plastics with fiber re-enforcement, aluminum or equivalent rigid, non-corroding materials. The support member may be bolted or cemented to said wall.

The tether means may be a stainless steel cable or chain, and may be continuous, yet attached to each support member. The tether means may be equipped with attachment means for a tug boat to be used for towing, or otherwise anchoring the position of the boom.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 3 is a sectional side view of the embodiment of FIG. 1, taken upon the line 3—3 of FIG. 1.

FIG. 4 is a reduced size fragmentary top view of the embodiment of FIG. 1 shown in a taut state.

DESCRIPTION OF THE PREFERRED EMBODIMENT

Figure 2:
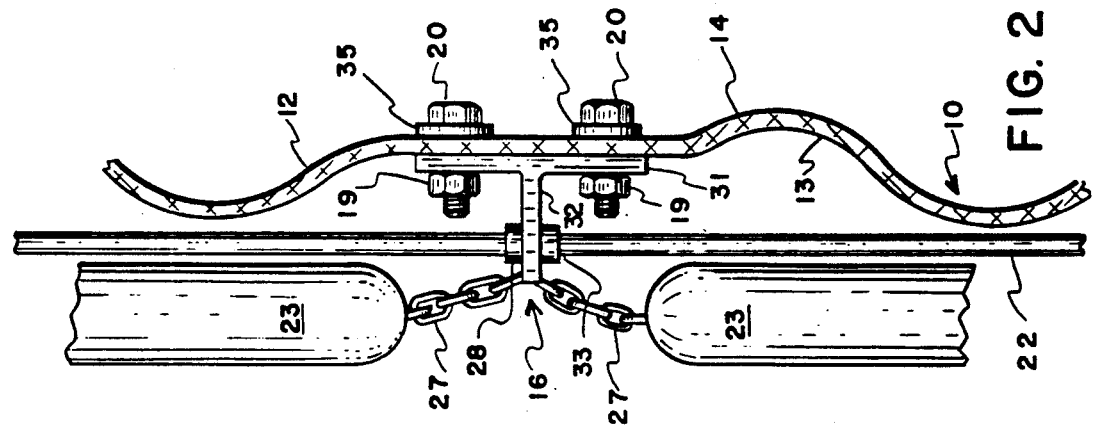
FIG. 2 is an enlarged fragmentary top view of the embodiment of FIG. 1.
Figure 1:
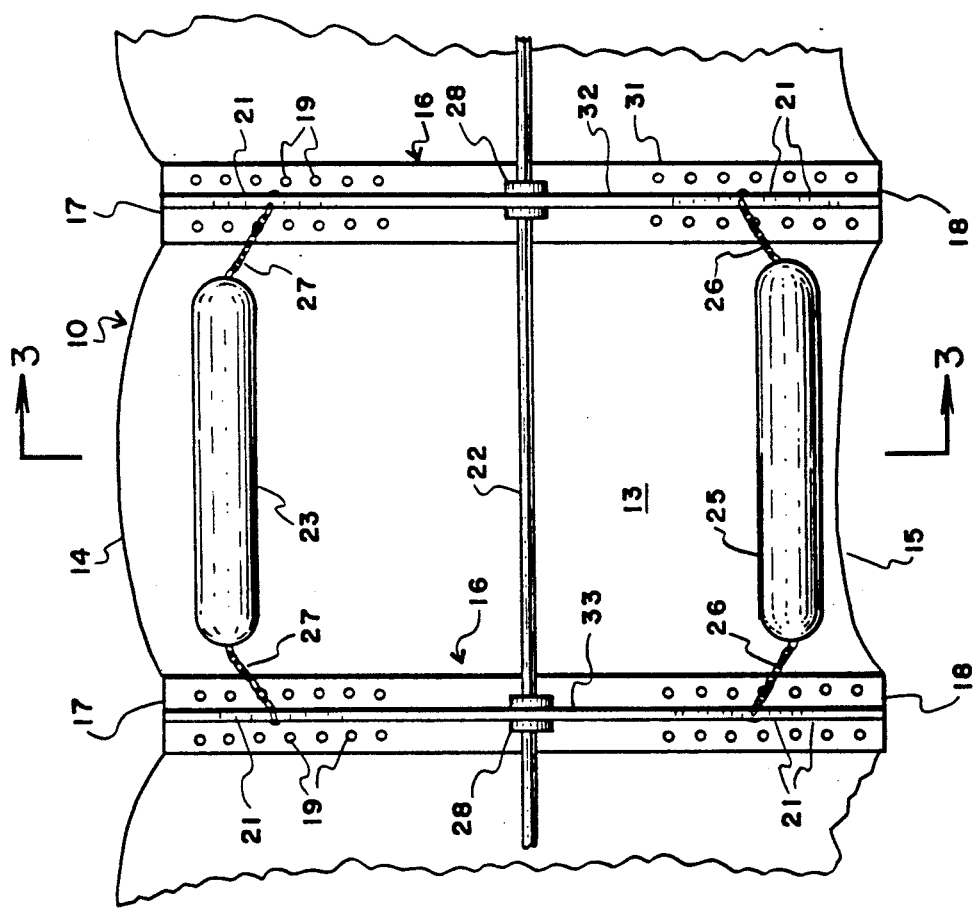
FIG. 1 is a fragmentary front view of an embodiment of the oil confining device of the present invention.

Referring to FIGS. 1-4, an embodiment of the oil confining device 30 of the present invention is shown deployed around tanker vessel 9 and comprised of a horizontally elongated continuous wall 10 of oil-impervious synthetic elastomeric polymer such as neoprene. Wall 10 has interior and exterior surfaces 12 and 13, respectively, and substantially straight parallel upper and lower edges 14 and 15 respectively. The wall may have a thickness between about 50 mils and ¼". The wall may be comprised of a monolithic film material or may be a fiber-reinforced film, or film/fabric laminate or a fabric rendered impervious by virtue of a penetrative deposit of an elastomeric polymer. Suitable wall materials include materials commonly employed as protective tarpaulins.

Elongated rigid vertical support members 16 are exemplified in the form of stainless steel braces of T- cross section comprised of a flat base portion 31 and center vane 32 perpendicularly emergent from the midpoint of said base portion. Support members 16 have upper and lower extremeties 17 and 18, respectively, and are affixed to exterior surface 13 by bolts 20 and nuts 19 interactive with base portion 31. Support members 16 are uniformly spaced apart and orthogonal to upper and lower edges 14 and 15, respectively. Each support member 16 has a plurality of mounting apertures 21 disposed in center vane 32 adjacent upper and lower extremities 17 and 18, respectively. A guide hole 33 is further disposed in center vane 32 at midheight thereof.

Tether means in the form of continuous retainer cable 22 passes through said guide holes 33 and is affixed to each support member 16 by means of cable clamps 28. Said tether means is in parallel disposition to edges 14 and 15 and is adapted to maintain spacing of support members 16 and thereby relieve longitudinal stresses along wall 10. Typically the length of cable 22 between adjacent support members will be 90% to 100% of the corresponding length of the section of wall 10 between the same support members. In alternative embodiments, the tether means may be in the form of chain or rope. In some embodiments, the cable may be secured at a few support members, permitting other members to move freely along the length of the cable, thereby relieving localized stress upon portions of the wall.

Float means 23 are adapted to engage apertures 21 by chains 27 at varying elevations upon support members 16, causing upper edge 14 to rise a height above the oil level 8 defined as freeboard height 24. Sinkers 25 are adapted to engage support members 16 by means of chains 26 adjacent lower edge 15, and thereby maintain wall 10 in vertical disposition.

The oil confining device may be stored aboard a ship or oil rig rolled upon a large spool with floats 23 and sinkers 25 disengaged and stored separately. Storage may alternatively be achieved in a back and forth folded state. Deployment is accomplished by simply unrolling wall 10 into the water and periodically stopping to affix floats and sinkers in their respective positions. The device may be fitted upon its ends with means for joining the ends to form a circle or joining two or more walls of the device end-to-end. The device may be anchored in position, towed behind a vessel 9, or allowed to drift in the current, depending upon the spill situation characteristics. The device may be stored for future deployment by rolling the wall back upon the spool and disengaging the floats and sinkers for separate storage.

In an alternative embodiment, the floats and weights may be of a compliant nature, enabling them to remain in position in the storage state of the device. In such embodiment, the floats may, for example be air-filled elongated plastic bags, and the weights may, for example be elongated fabric pouches filled with sand.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A device for confining oil floating upon the surface of a large body of water, said device comprised of:

a) an elongated continuous wall of pliable oil-resistant material having interior and exterior surfaces, and substantially parallel upper and lower edges, b) a multiplicity of rigid support members having upper and lower extremities and a plurality of mounting apertures, said support members being affixed to said exterior surface in uniformly spaced apart relationship and orthogonal to said upper and lower edges, said support members having a T- cross section configuration comprising a flat base portion and a center vane perpendicularly emergent from said base portion, c) non-extendable tether means extending in joinder between adjacent support members in parallel disposition in said upper and lower edges and adapted to limit the spacing of said support members and thereby relieve longitudinal stresses along said wall, d) float means adapted to engage said apertures at varying elevations upon said support members, causing said upper edges to rise a height above the oil level, and e) sinker means adapted to engage said support members adjacent their lower extremities, and thereby maintain said wall in a vertical disposition.

2. The device of claim 1 wherein said continuous wall is a sheet of synthetic elastomeric material.

3. The device of claim 1 wherein said support member is attached by said flat base portion to said exterior surface.

4. The device of claim 1 wherein said tether means joins said center vane of said support members.

5. The device of claim 1 wherein said mounting apertures are disposed within said center vane.

6. The device of claim 1 wherein said float means and sinker means are of elongated configuration horizontally positioned between said support members.

* * * * *